United States Patent
Lee et al.

(10) Patent No.: US 12,179,607 B2
(45) Date of Patent: Dec. 31, 2024

(54) INTEGRATED POWER SUPPLY OF VEHICLE AND CONTROL METHOD THEREOF

(71) Applicants: HYUNDAI MOTOR COMPANY, Seoul (KR); Kia Corporation, Seoul (KR)

(72) Inventors: Sangkyu Lee, Yongin-si (KR); Wonseok Jin, Chungcheongnam-do (KR); Tae Woo Kim, Anyang-si (KR); Sela Lim, Hwaseong-si (KR); Sang Don Lee, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 517 days.

(21) Appl. No.: 17/544,425

(22) Filed: Dec. 7, 2021

(65) Prior Publication Data

US 2022/0402362 A1 Dec. 22, 2022

(30) Foreign Application Priority Data

Jun. 17, 2021 (KR) .......................... 10-2021-0078510

(51) Int. Cl.
*B60L 3/00* (2019.01)
*B60L 58/10* (2019.01)
*B60R 16/033* (2006.01)
*H02M 3/00* (2006.01)

(52) U.S. Cl.
CPC ............. *B60L 3/0046* (2013.01); *B60L 58/10* (2019.02); *B60R 16/033* (2013.01); *H02M 3/00* (2013.01); *B60L 2210/10* (2013.01); *B60L 2240/547* (2013.01)

(58) Field of Classification Search
None
See application file for complete search history.

(56) References Cited

U.S. PATENT DOCUMENTS

| 9,878,623 B2 * | 1/2018 | Choi ........................ B60L 53/20 |
| 2012/0228931 A1 * | 9/2012 | Butzmann ........... H01M 10/441 |
| | | 307/82 |

* cited by examiner

*Primary Examiner* — Robert Grant
(74) *Attorney, Agent, or Firm* — MORGAN, LEWIS & BOCKIUS LLP

(57) ABSTRACT

An integrated power supply includes a first low voltage DC-DC converter (LDC) that converts supply power to a first output voltage and provides the first output voltage to a first auxiliary battery and a first electric load connected to each other in parallel; a second LDC that converts the supply power to a second output voltage and provides the first output voltage to a second auxiliary battery and a second electric load connected to each other in parallel; and an integrated controller that controls the first LDC and the second LDC to change output voltages of the first LDC and the second LDC. The first auxiliary battery and the second auxiliary battery are connected in series, and when the first LDC fails, the second LDC outputs a second increase output voltage that is higher than the second output voltage under control of the integrated controller.

4 Claims, 4 Drawing Sheets

INTEGRATED POWER SUPPLY OF VEHICLE AND CONTROL METHOD THEREOF

CROSS-REFERENCE TO RELATED APPLICATION

This application claims priority to and the benefit of Korean Patent Application No. 10-2021-0078510 filed in the Korean Intellectual Property Office on Jun. 17, 2021, the entire contents of which are incorporated herein by reference.

TECHNICAL FIELD

The present disclosure relates to an integrated power supply of a vehicle and a control method thereof. More particularly, the present disclosure relates to an integrated power supply of a vehicle and a control method thereof that may improve power supplying efficiency during a fail-safe period.

BACKGROUND

In commercial environment-friendly vehicles such as electric trucks, hydrogen trucks, electric buses, and hydrogen electric buses, both electric loads using 24 V power and electric loads using 12 V power are included, unlike general vehicles.

In order to smoothly supply power to a 12 V electric load using 12 V power and a 24 V electric load using 24 V power, a low voltage DC-DC converter (hereinafter referred to as an LDC), a battery equalizer (hereinafter referred to as a BEQ), and two auxiliary batteries capable of supplying power to a 12 V electric load and a 24 V electric load are used. Power for entire electric loads is supplied by the LDC, and the BEQ receives 24 V power from the LDC and provides power to a 12 V electric load, thereby preventing excessive discharge of the auxiliary battery that provides power to the 12 V electric load and balancing the two auxiliary batteries.

However, when the LDC fails, both of the auxiliary batteries may be discharged, so that a vehicle may be in a dangerous situation. In addition, when the BEQ fails, excessive discharge of the auxiliary battery that provides power to the 12 V electric load may occur, resulting in a situation in which the 12 V electric load cannot operate.

The above information disclosed in this Background section is only for enhancement of understanding of the background of the disclosure, and therefore it may contain information that does not form the prior art that has been already known to a person of ordinary skill in the art.

SUMMARY

The embodiment of the present disclosure has been made in an effort to provide an integrated power supply and a control method thereof that may stably supply power to a 12 V electric load and a 24 V electric load and may improve power supply efficiency in a fail-safe situation.

An embodiment of the present disclosure provides an integrated power supply, including: a first low voltage DC-DC converter (LDC) that converts supply power to a first output voltage and provides the first output voltage to a first auxiliary battery and a first electric load connected to each other in parallel; a second LDC that converts the supply power to a second output voltage and provides the second output voltage to a second auxiliary battery and a second electric load connected to each other in parallel; and an integrated controller that controls the first LDC and the second LDC to change output voltages of the first LDC and the second LDC. The first auxiliary battery and the second auxiliary battery are connected in series, and when the first LDC fails, the second LDC outputs a second increase output voltage that is higher than the second output voltage under control of the integrated controller.

When the second LDC fails, the first LDC may output a first increase output voltage that is higher than the first output voltage under control of the integrated controller.

The integrated controller may request a fail-safe to a vehicle control unit (VCU) or an electronic control unit (ECU) through CAN communication when the first LDC fails or the second LDC fails.

The second LDC may adjust an amount of current of the second output voltage outputted from an output terminal of the second LDC to be the same as an amount of current flowing from a node between the first auxiliary battery and the second auxiliary battery to the second electric load, so that the first auxiliary battery and the second auxiliary battery may be balanced.

Another embodiment of the present disclosure provides a control method of an integrated power supply that includes a first LDC providing a first output voltage to a first auxiliary battery and a first electric load connected to each other in parallel, a second LDC providing a second output voltage to a second auxiliary battery and a second electric load connected to each other in parallel, and an integrated controller changing output voltages of the first LDC and the second LDC, including: outputting, by the second LDC, a second increase output voltage that is higher than the second output voltage under control of the integrated controller when the failure of the first LDC is confirmed; and outputting, by the first LDC, a first increase output voltage that is higher than the first output voltage under control of the integrated controller when the failure of the second LDC is confirmed.

The control method of the integrated power supply may further include requesting, by the integrated controller, a fail-safe to a vehicle control unit or an electronic control unit through CAN communication when the first LDC fails or the second LDC fails.

The control method of the integrated power supply may further include, in a normal state, adjusting, by the second LDC, an amount of current of the second output voltage outputted from an output terminal of the second LDC to be the same as an amount of current flowing from a node between the first auxiliary battery and the second auxiliary battery to the second electric load so that the first auxiliary battery and the second auxiliary battery are balanced.

According to the embodiment of the present disclosure, it is possible to reduce a design cost, a size, and a weight by integrating the existing LDC and BEQ into one integrated power supply, and it is possible to stably supply power to a 12 V electric load and a 24 V electric load and to improve power supply efficiency in a fail-safe situation.

DETAILED DESCRIPTION

Figure 1:
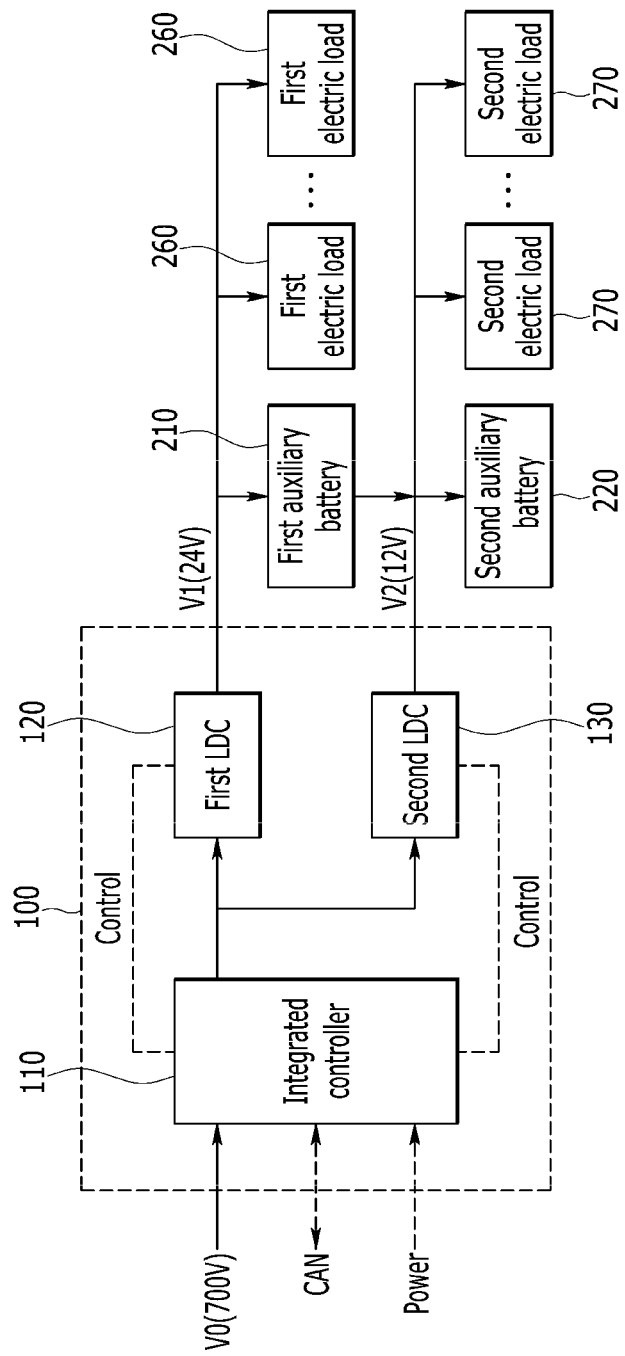
FIG. 1 illustrates a block diagram of an integrated power supply of a vehicle according to an embodiment of the present disclosure.

The embodiment of the present disclosure will be described more fully hereinafter with reference to the accompanying drawings, in which embodiments of the disclosure are shown. As those skilled in the art would realize, the described embodiment may be modified in various different ways, all without departing from the spirit or scope of the present disclosure.

In order to clearly describe the present disclosure, parts that are irrelevant to the description are omitted, and identical or similar constituent elements throughout the specification are denoted by the same reference numerals.

In addition, unless explicitly described to the contrary, the word "comprise" and variations such as "comprises" or "comprising" will be understood to imply the inclusion of stated elements but not the exclusion of any other elements.

FIG. 1 illustrates a block diagram of an integrated power supply of a vehicle according to an embodiment of the present disclosure.

Referring to FIG. 1, an integrated power supply 100 of a vehicle includes an integrated controller 110, a first LDC 120, and a second LDC 130.

The integrated controller 110 may receive supply power V0 from the outside to transmit the supply power V0 to the first LDC 120 and the second LDC 130. For example, the integrated controller 110 may receive the supply power V0 of 700 V from a high voltage battery to transmit it to the first LDC 120 and the second LDC 130.

In addition, the integrated controller 110 may be operated by receiving power for operation, and may communicate with a vehicle control unit (hereinafter referred to as a VCU) or electronic control unit (hereinafter referred to as an ECU) by a controller area network (CAN). The integrated controller 110 may request fail-safe to the VCU or ECU through the CAN communication when a failure occurs in the first LDC 120 and the second LDC 130.

In addition, the integrated controller 110 may control the first LDC 120 and the second LDC 130 to change output voltages of the first LDC 120 and the second LDC 130.

The first LDC 120 may convert the supply power V0 to a first output voltage V1 to output it. For example, the first LDC 120 may convert the supply power V0 of 700 V to the first output voltage V1 of 24 V to output it. A first auxiliary battery 210 and one or more first electric loads 260 are connected in parallel to an output terminal of the first LDC 120, and the first output voltage V1 outputted from the first LDC 120 may be provided to the first auxiliary battery 210 and one or more first electric loads 260. The first electric load 260 may be a device having the first output voltage V1 as a rated voltage or a nominal voltage.

In addition, the first LDC 120 may convert the supply power V0 of 700 V into a first increase output voltage V1' to be described later in FIG. 3 according to control of the integrated controller 110 to output it. That is, the first LDC 120 may change the first output voltage V1 to the first increase output voltage V1' according to the control of the integrated controller 110 to output it.

The second LDC 130 may convert the supply power V0 to a second output voltage V2 to output it. For example, the second LDC 130 may convert the supply power V0 of 700 V to the second output voltage V1 of 12 V to output it. A second auxiliary battery 220 and one or more second electric loads 270 are connected in parallel to an output terminal of the second LDC 130, and the second output voltage V2 outputted from the second LDC 130 may be provided to the second auxiliary battery 220 and one or more second electric loads 270. The second electric load 270 may be a device having the second output voltage V2 as a rated voltage or a nominal voltage.

In addition, the second LDC 130 may convert the supply power V0 of 700 V into a second increase output voltage V2' to be described later in FIG. 2 according to control of the integrated controller 110 to output it. That is, the second LDC 130 may change the second output voltage V2 to the second increase output voltage V2' according to the control of the integrated controller 110 to output it.

The first auxiliary battery 210 and the second auxiliary battery 220 may be connected in series, and one or more second electric loads 270 may be connected to a node between the first auxiliary battery 210 and the second auxiliary battery 220. The first auxiliary battery 210 and the second auxiliary battery 220 may have the same discharge voltage as the second output voltage V2.

In a normal state, the second LDC 130 controls an amount of current of the second output voltage V2 outputted from the output terminal thereof under the control of the integrated controller 110 to be the same as an amount of current flowing from a node between the first auxiliary battery 210 and the second auxiliary battery 220 to one or more second electric loads 270, so that the first auxiliary battery 210 and the second auxiliary battery 220 may be balanced.

When the first LDC 120 or second LDC 130 fails, the integrated controller 110 controls the first LDC 120 or second LDC 130 and changes the output voltage of the first LDC 120 or second LDC 130 such that the first electric load 260 and the second electric load 270 normally operate, thus the vehicle may be stably driven. This will be described with reference to FIG. 2 and FIG. 3.

Figure 2:
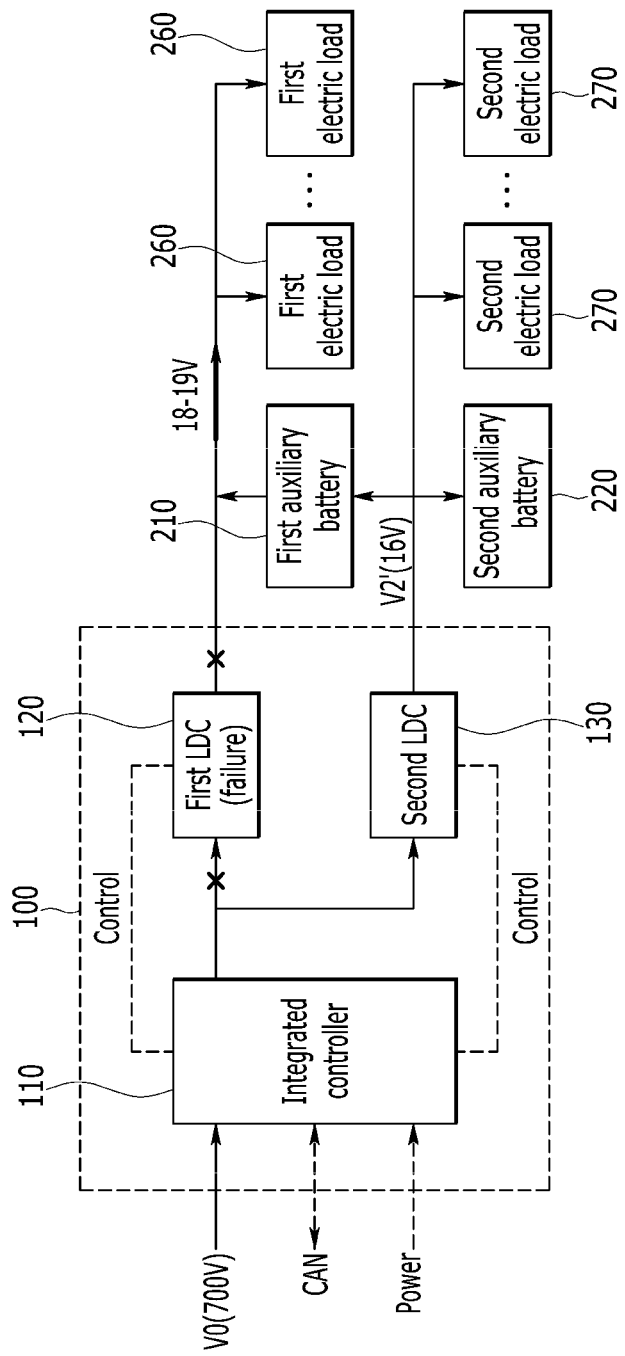
FIG. 2 is a drawing for explaining an operation when a first LDC fails in an integrated power supply of a vehicle according to an embodiment of the present disclosure.

FIG. 2 is a drawing for explaining an operation when a first LDC fails in an integrated power supply of a vehicle according to an embodiment of the present disclosure.

Referring to FIG. 2, when the first LDC 120 fails, the integrated controller 110 may stop the operation of the first LDC 120, and accordingly, the output of the first LDC 120 may be blocked. In addition, the integrated controller 110 controls the second LDC 130, so that the second LDC 130 converts the supply power V0 into the second increase output voltage V2' to output it. The second increase output voltage V2' is a higher voltage than the second output voltage V2. For example, when the second output voltage V2 is 12 V, the second increase output voltage V2' may be 16 V.

In other words, in the normal state, the second LDC 130 may operate in current control adjusting the amount of current to balance the first auxiliary battery 210 and the second auxiliary battery 220, while it may operate in voltage control outputting the second increase output voltage V2' when the first LDC 120 fails.

The second increase output voltage V2' outputted from the second LDC 130 is transmitted to the first auxiliary battery 210, and even if the first auxiliary battery 210 is completely discharged, since the output voltage of 2 V to 3 V is maintained due to the characteristics of the battery, the first auxiliary output voltage provided from the first auxiliary battery 210 to the first electric load 260 may be maintained at a level of 18 V to 19 V. Since an operating range of the first electric load 260 with a rated voltage of 24 V is approximately 16 V to 32 V, the first electric load 260 may normally operate even with the first auxiliary output voltage of 18 V to 19 V.

In addition, since an operating range of the second electric load 270 with a rated voltage of 12 V is approximately 8 V to 18 V, the second electric load 270 may normally operate with the second increase output voltage V2' of 16 V.

However, since the second LDC 130 has to handle both the first electric load 260 and the second electric load 270, cooperative control of the electric loads is required, and for this, the integrated controller 110 requests fail-safe to the VCU or ECU through CAN communication such that it is possible to allow only a main electric load to operate.

Figure 3:
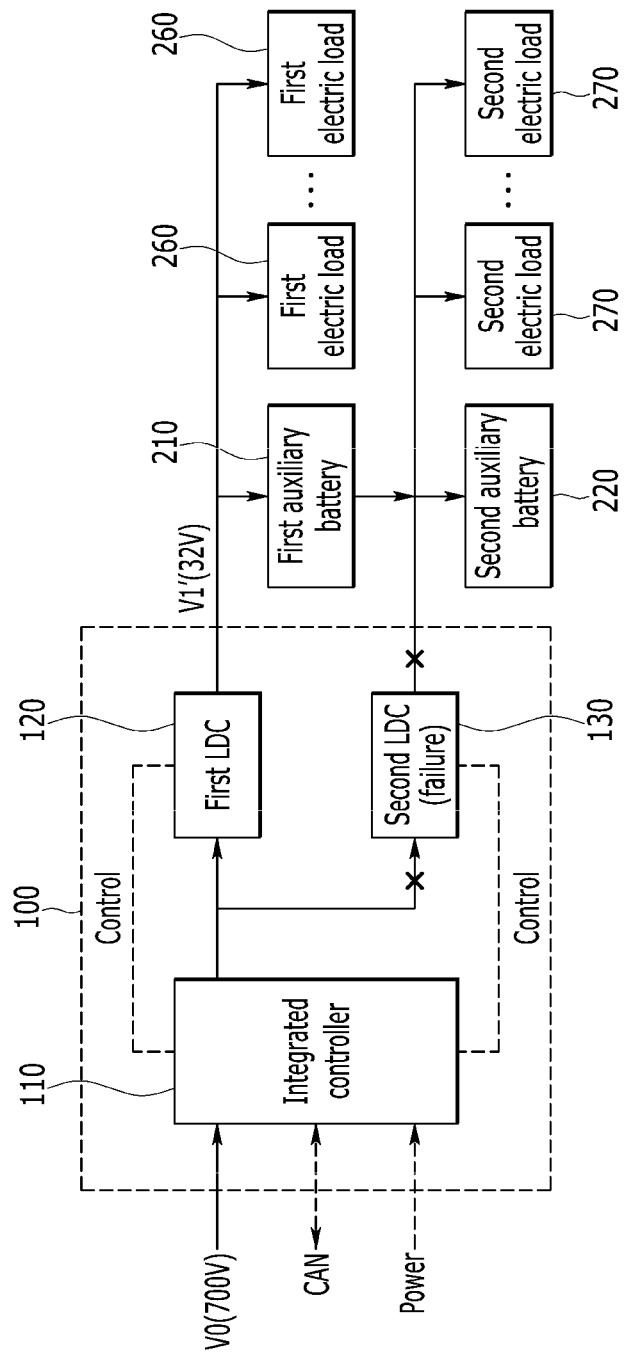
FIG. 3 is a drawing for explaining an operation when a second LDC fails in an integrated power supply of a vehicle according to an embodiment of the present disclosure.

FIG. 3 is a drawing for explaining an operation when a second LDC fails in an integrated power supply of a vehicle according to an embodiment of the present disclosure.

Referring to FIG. 3, when the second LDC 130 fails, the integrated controller 110 may stop the operation of the second LDC 130, and accordingly, the output of the second LDC 130 may be blocked. When the second LDC 130 fails, since the second output voltage V2 is not provided from the second LDC 130, the balance between the first auxiliary battery 210 and the second auxiliary battery 220 is broken, and accordingly, the second auxiliary battery 220 is completely discharged, so that the second electric load 270 may not normally operate. To prevent this problem, the integrated controller 110 controls the first LDC 120 so that the first LDC 120 converts the supply power V0 to the first increase output voltage V1' to output it. The first increase output voltage V1' is a higher voltage than the first output voltage V1. For example, when the first output voltage V1 is 24 V, the first increase output voltage V1' may be 32 V.

When the first output voltage V1 outputted from the first LDC 120 is increased to the first increase output voltage V1', although it is not possible to completely prevent the balance between the first auxiliary battery 210 and the second auxiliary battery 220 from being broken, since the amount of current charged in the first auxiliary battery 210 and the amount of current supplied from the first auxiliary battery 210 to the second auxiliary battery 220 may be increased, it is possible to prevent the second auxiliary battery 220 from being discharged. Accordingly, the second electric load 270 may normally operate, and the vehicle may be stably driven.

Even in this case, for cooperative control of the electric loads, the integrated controller 110 may request the fail-safe to the VCU or ECU through the CAN communication so that only the main electric loads operate.

Hereinafter, a control method of the integrated power supply 100 described above will be described with reference to FIG. 4.

Figure 4:
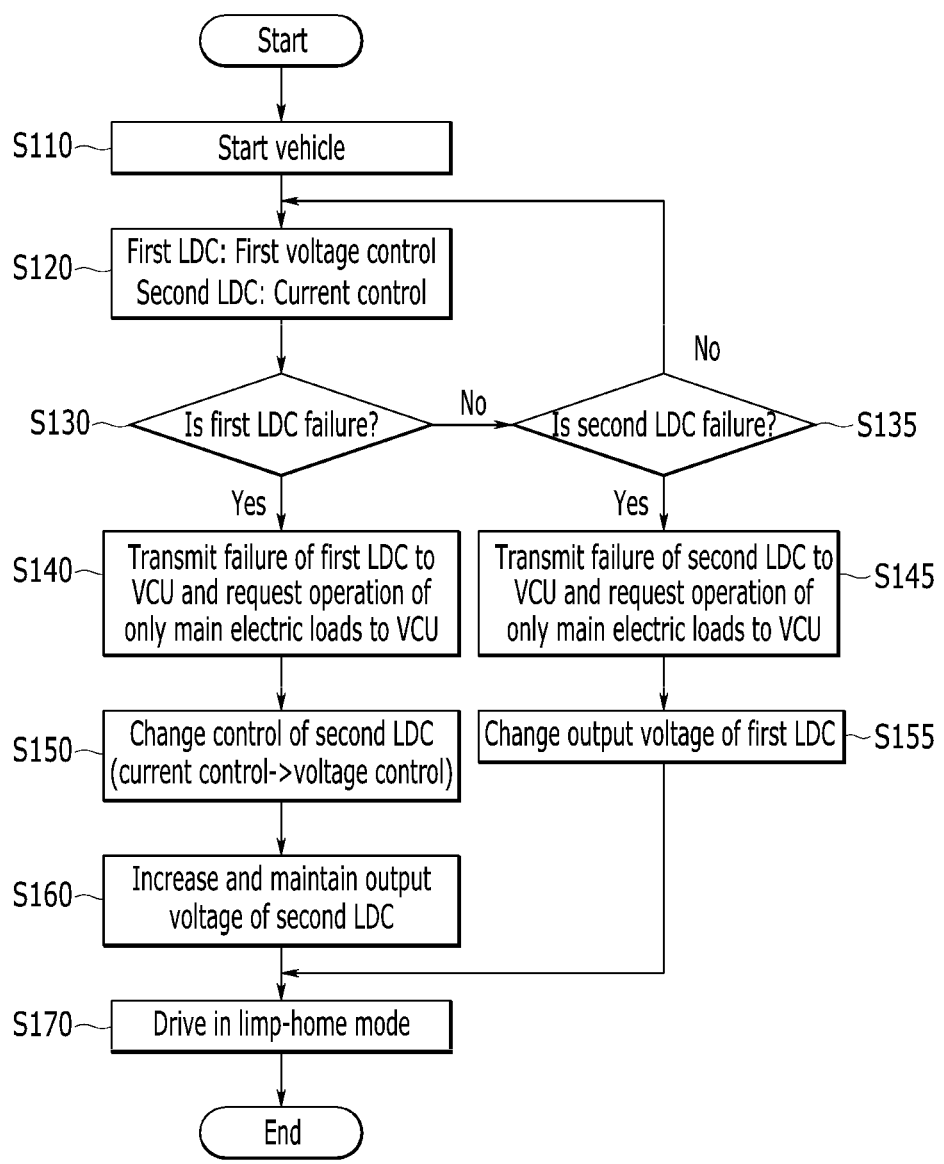
FIG. 4 illustrates a flowchart of a control method of an integrated power supply of a vehicle according to an embodiment of the present disclosure.

FIG. 4 illustrates a flowchart of a control method of an integrated power supply of a vehicle according to an embodiment of the present disclosure.

Referring to FIG. 4, when a vehicle is started and the vehicle may be driven (S110), the integrated controller 110 may perform first voltage control so that the first LDC 120 outputs the first output voltage V1 and may perform current control so that the second LDC 130 controls a current amount of the second output voltage V2 (S120).

The integrated controller 110 may repeatedly perform a process (S130) of checking whether the first LDC 120 fails and a process (S135) of checking whether the second LDC 130 fails, during vehicle's starting.

When the failure of the first LDC 120 is confirmed, the integrated controller 110 may transmit the failure of the first LDC 120 and may request a fail-safe function so that only the main electric loads operate, to the VCU (or ECU) through the CAN communication (S140). In addition, the integrated controller 110 may change the current control of the second LDC 130 to the voltage control so that the second LDC 130 may output the second increase output voltage V2' (S150). The second LDC 130 may increase the output voltage to the second increase output voltage V2' to maintain it (S160). The second increase output voltage V2' outputted from the second LDC 130 is transmitted to the first auxiliary battery 210, and the first auxiliary output voltage belonging to the operating range of the first electric load 260 is provided to the first electric load 260 from the first auxiliary battery 210, so that the first electric load 260 may normally operate.

When the failure of the second LDC 130 is confirmed, the integrated controller 110 may transmit the failure of the second LDC 130 and may request a fail-safe function so that only the main electric loads operate, to the VCU (or ECU) through the CAN communication (S145). In addition, the integrated controller 110 controls the first LDC 120 so that the first LDC 120 changes the first output voltage V1 to the first increase output voltage V1' to output it (S155). When the first output voltage V1 outputted from the first LDC 120 is increased to the first increase output voltage V1', an amount of current charged in the first auxiliary battery 210 and an amount of current provided from the first auxiliary battery 210 to the second auxiliary battery 220 may be increased. Accordingly, the second auxiliary battery 220 may be prevented from being discharged, and the second electric load 270 may normally operate.

When the first LDC 120 fails, the second LDC 130 has to manage both the first electric load 260 and the second electric load 270, and when the second LDC 130 fails, the first LDC 120 has to manage both the first electric load 260 and the second electric load 270, so that the VCU (or ECU) may allow the vehicle to travel in a limp-home mode according to a fail-safe request from the integrated controller 110 (S170).

The integrated controller 110 may include a processor or a microprocessor. In addition, the integrated controller 110 may also include a memory. The aforementioned operations/functions of the integrated controller 110 can be embodied as computer readable code/algorithm/software stored on the memory thereof which may include a non-transitory computer readable recording medium. The non-transitory computer readable recording medium is any data storage device that can store data which can thereafter be read by the processor or the microprocessor. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc. The processor or the microprocessor may perform the above-described operations/functions of the integrated controller 110, by executing the computer readable code/algorithm/software stored on the non-transitory computer readable recording medium.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims. Therefore, those skilled in the art will understand that various modifications and other equivalent embodiments of the present disclosure are possible. Consequently, the true technical protective scope of the present disclosure must be determined based on the technical spirit of the appended claims.

What is claimed is:

1. An integrated power supply, comprising:
   a first LDC that converts supply power to a first output voltage and provides it to a first auxiliary battery and a first electric load connected to each other in parallel;
   a second LDC that converts the supply power to a second output voltage and provides it to a second auxiliary battery and a second electric load connected to each other in parallel; and
   an integrated controller that controls the first LDC and the second LDC to change output voltages of the first LDC and the second LDC,
   wherein the first auxiliary battery and the second auxiliary battery are connected in series,
   when the first LDC fails, the second LDC outputs a second increase output voltage that is higher than the second output voltage under control of the integrated controller,
   when the second LDC fails, the first LDC outputs a first increase output voltage that is higher than the first output voltage under control of the integrated controller, and
   the integrated controller requests a fail-safe to a vehicle control unit (VCU) or an electronic control unit (ECU) through CAN communication when the first LDC fails or the second LDC fails.

2. An integrated power supply, comprising:
   a first LDC that converts supply power to a first output voltage and provides it to a first auxiliary battery and a first electric load connected to each other in parallel;
   a second LDC that converts the supply power to a second output voltage and provides it to a second auxiliary battery and a second electric load connected to each other in parallel; and
   an integrated controller that controls the first LDC and the second LDC to change output voltages of the first LDC and the second LDC,
   wherein the first auxiliary battery and the second auxiliary battery are connected in series,
   when the first LDC fails, the second LDC outputs a second increase output voltage that is higher than the second output voltage under control of the integrated controller, and
   the second LDC adjusts an amount of current of the second output voltage outputted from an output terminal to be the same as an amount of current flowing from a node between the first auxiliary battery and the second auxiliary battery to the second electric load, so that the first auxiliary battery and the second auxiliary battery are balanced.

3. A control method of an integrated power supply that includes a first LDC providing a first output voltage to a first auxiliary battery and a first electric load connected to each other in parallel, a second LDC providing a second output voltage to a second auxiliary battery and a second electric load connected to each other in parallel, and an integrated controller changing output voltages of the first LDC and the second LDC, comprising:
   outputting, by the second LDC, a second increase output voltage that is higher than the second output voltage under control of the integrated controller when the failure of the first LDC is confirmed;
   outputting, by the first LDC, a first increase output voltage that is higher than the first output voltage under control of the integrated controller when the failure of the second LDC is confirmed; and
   requesting, by the integrated controller, a fail-safe to a vehicle control unit or an electronic control unit through CAN communication when the first LDC fails or the second LDC fails.

4. A control method of an integrated power supply that includes a first LDC providing a first output voltage to a first auxiliary battery and a first electric load connected to each other in parallel, a second LDC providing a second output voltage to a second auxiliary battery and a second electric load connected to each other in parallel, and an integrated controller changing output voltages of the first LDC and the second LDC, comprising:
   outputting, by the second LDC, a second increase output voltage that is higher than the second output voltage under control of the integrated controller when the failure of the first LDC is confirmed;
   outputting, by the first LDC, a first increase output voltage that is higher than the first output voltage under control of the integrated controller when the failure of the second LDC is confirmed; and
   in a normal state, adjusting, by the second LDC, an amount of current of the second output voltage outputted from an output terminal to be the same as an amount of current flowing from a node between the first auxiliary battery and the second auxiliary battery to the second electric load so that the first auxiliary battery and the second auxiliary battery are balanced.

* * * * *